United States Patent
Fujii et al.

(10) Patent No.: US 9,412,485 B2
(45) Date of Patent: Aug. 9, 2016

(54) LANIO3 THIN FILM-FORMING COMPOSITION AND METHOD OF FORMING LANIO3 THIN FILM USING THE SAME

(71) Applicant: MITSUBISHI MATERIALS CORPORATION, Tokyo (JP)

(72) Inventors: Jun Fujii, Naka-gun (JP); Hideaki Sakurai, Naka-gun (JP); Nobuyuki Soyama, Naka-gun (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 255 days.

(21) Appl. No.: 14/173,049

(22) Filed: Feb. 5, 2014

(65) Prior Publication Data
US 2014/0227433 A1    Aug. 14, 2014

(30) Foreign Application Priority Data
Feb. 13, 2013    (JP) .................................. 2013-025671

(51) Int. Cl.
| | | |
|---|---|---|
| *C04B 35/01* | (2006.01) | |
| *H01B 1/08* | (2006.01) | |
| *H01B 13/00* | (2006.01) | |
| *C23C 18/12* | (2006.01) | |
| *C04B 35/624* | (2006.01) | |
| *C04B 35/626* | (2006.01) | |
| *C04B 35/632* | (2006.01) | |

(52) U.S. Cl.
CPC ........ *H01B 1/08* (2013.01); *C04B 35/01* (2013.01); *C04B 35/624* (2013.01); *C04B 35/62625* (2013.01); *C04B 35/632* (2013.01); *C23C 18/1216* (2013.01); *C23C 18/1225* (2013.01); *C23C 18/1279* (2013.01); *H01B 13/00* (2013.01); *C04B 2235/3227* (2013.01); *C04B 2235/3279* (2013.01); *C04B 2235/441* (2013.01); *C04B 2235/443* (2013.01); *C04B 2235/449* (2013.01); *C04B 2235/6585* (2013.01)

(58) Field of Classification Search
CPC .................. C04B 35/01; C04B 35/624; C04B 2235/3279; C04B 35/632; C04B 2235/441; C04B 2235/443; C04B 2235/449; C23C 18/1216; C23C 18/1225; C23C 18/1279
See application file for complete search history.

(56) References Cited

U.S. PATENT DOCUMENTS

| | | | | |
|---|---|---|---|---|
| 7,088,869 B2 * | 8/2006 | Satoh | ................... | G06F 17/148 375/E7.045 |
| 7,790,486 B2 * | 9/2010 | Kwak | ................... | H01L 33/405 438/29 |
| 8,435,813 B2 * | 5/2013 | Kwak | ................... | H01L 33/405 438/29 |

FOREIGN PATENT DOCUMENTS

| | | |
|---|---|---|
| CN | 1362749 A | 8/2002 |
| CN | 101178954 A | 5/2008 |
| CN | 101863679 A | 10/2010 |
| JP | 3079262 B | 8/2000 |
| KR | 10-2012-0057725 A | 6/2012 |
| WO | WO-2010/035035 A2 | 4/2010 |

OTHER PUBLICATIONS

Yoshio Shodai et al., "Preparation of Lanthanum Nickel Oxide-Coated Ni Sheet Anodes and Their Application to Electrolytic Production of $(CF_3)_3N$ in $(CH_3)_4NF.4.0HF$ Melt", Journal of Rare Earths, vol. 24, No. 1, Feb. 1, 2006, pp. 1-8.

Hu Wencheng et al., "Characterization of Sn-doped BST thin films on $LaNiO_3$-coated Si substrate", Journal of Materials Science, vol. 19, No. 1, Mar. 13, 2007, pp. 61-66.

D. Dong et al., "Surface morphology of $LaNiO_3$ thin films and its dependence on annealing temperatures", Transactions of the Institute of Metal Finishing, vol. 85, No. 2, Mar. 1, 2007, pp. 107-110.

Search Report dated May 20, 2015, issued for the European patent application No. 14154100.3.

Search Report issued in corresponding Chinese Patent Application No. CN 201410045429.2, dated Mar. 3, 2016.

* cited by examiner

*Primary Examiner* — David M Brunsman
(74) *Attorney, Agent, or Firm* — Locke Lord LLP; James E. Armstrong, IV; Nicholas J. DiCeglie, Jr.

(57) ABSTRACT

A $LaNiO_3$ thin film having extremely few voids is uniformly formed. Provided is a $LaNiO_3$ thin film-forming composition for forming a $LaNiO_3$ thin film. It includes: a $LaNiO_3$ precursor; a first organic solvent; a stabilizer; and a second organic solvent. The first organic solvent includes carboxylic acids, alcohols, esters, ketones, ethers, cycloalkanes, aromatic compounds, or tetrahydrofuran. The stabilizer includes β-diketones, β-ketones, β-keto esters, oxyacids, diols, triols, carboxylic acids, alkanolamines, or polyvalent amines. The second organic solvent has a boiling point of 150° C. to 300° C. and a surface tension of 20 to 50 dyn/cm. The $LaNiO_3$ precursor content is 1 to 20 mass % with respect to 100 mass % of the composition. The stabilizer content is 0 to 10 mol with respect to 1 mol of a total amount of the $LaNiO_3$ precursors. The second organic solvent content is 5 to 20 mass % with respect to the composition.

6 Claims, 1 Drawing Sheet

LANIO3 THIN FILM-FORMING COMPOSITION AND METHOD OF FORMING LANIO3 THIN FILM USING THE SAME

BACKGROUND OF THE INVENTION

1. Field of the Invention

The present invention relates to a composition for forming a $LaNiO_3$ thin film, which is used for an electrode of a thin film capacitor, a ferroelectric random access memory (FeRAM) capacitor, a piezoelectric element, a pyroelectric infrared detecting element, or the like, with a chemical solution deposition (CSD) method; and a method of forming a $LaNiO_3$ thin film using this composition. Specifically, the present invention relates to a $LaNiO_3$ thin film-forming composition capable of uniformly forming a film having extremely few voids; and a method of forming a $LaNiO_3$ thin film using this composition.

2. Description of Related Art $LaNiO_3$ (LNO) is known as a material having superior electrical characteristics such as high conductivity and being strongly self-oriented to plane (100). Further, due to its pseudo-cubic perovskite structure, a $LaNiO_3$ (LNO) thin film has superior affinity with a perovskite type ferroelectric thin film and has a small misfit in a lattice constant. Therefore, the $LaNiO_3$ (LNO) thin film is used as a crystal orientation controlling layer when a ferroelectric thin film which is preferentially oriented to (100) plane is formed in a thin film capacitor or the like. In addition, the $LaNiO_3$ (LNO) thin film has a relatively small electric resistance and, as compared to a case where a metal such as Pt is used for an electrode, has superior polarization reversal fatigue characteristics of a ferroelectric film. Therefore, the $LaNiO_3$ (LNO) thin film itself can also be used as an electrode film of a FeRAM capacitor, a piezoelectric element, or the like. Further, due to its translucency, the $LaNiO_3$ (LNO) thin film can also be used as an electrode film or the like of a pyroelectric infrared detecting element. Typically, in addition to a vacuum deposition method such as a sputtering method, the $LaNiO_3$ thin film is formed using a CSD method such as a sol-gel method including: coating a sol-gel solution (composition) in which $LaNiO_3$ precursors are dissolved in a solvent to form a coating film; and baking the coating film at a predetermined temperature to be crystallized (for example, refer to Japanese Patent No. 3079262 (Claim 3, paragraph [0013])).

SUMMARY OF THE INVENTION

However, currently, it is hard to say that a method of forming a $LaNiO_3$ thin film using a CSD method such as a sol-gel method has been adequately established. For example, differences in film-forming conditions such as the kind of a solvent contained in a composition or a baking temperature may cause various problems. In the film forming method disclosed in Japanese Patent No. 3079262 (Claim 3, paragraph [0013]), a large number of voids are formed in a thin film after baking, and there may be a problem in that a film cannot be uniformly formed. The major cause is presumed to be that the used composition contains a water-soluble component having a large surface tension as a solvent. When the film thickness is non-uniform due to the formation of voids, there is a problem in that, for example, the resistivity of the film increases. In consideration of the above-described circumstances, the present inventors have attempted to make an improvement, when a $LaNiO_3$ thin film is formed using a sol-gel method, particularly in terms of the selection and the like of materials contained in a composition. As a result, the present inventors have completed the present invention capable of significantly suppressing the formation of voids and uniformly forming a film.

An object of the present invention is to provide a $LaNiO_3$ thin film-forming composition capable of uniformly forming a film having extremely few voids; and a method of forming a $LaNiO_3$ thin film using this composition.

According to a first aspect of the present invention, there is provided a $LaNiO_3$ thin film-forming composition for forming a $LaNiO_3$ thin film, the composition containing: $LaNiO_3$ precursors; one or more first organic solvents selected from the group consisting of carboxylic acids, alcohols, esters, ketones, ethers, cycloalkanes, aromatic compounds, and tetrahydrofuran; one or more stabilizers selected from the group consisting of β-diketones, β-ketones, β-keto esters, oxyacids, diols, triols, carboxylic acids, alkanolamines, and polyvalent amines; and a second organic solvent having a boiling point of 150° C. to 300° C. and a surface tension of 20 dyn/cm to 50 dyn/cm, in which a ratio of the $LaNiO_3$ precursors is 1 mass % to 20 mass % in terms of oxides with respect to 100 mass % of the composition, a ratio of the stabilizer is greater than 0 mol and less than or equal to 10 mol with respect to 1 mol of a total amount of the $LaNiO_3$ precursors in the composition, and a ratio of the second organic solvent is 5 mass % to 20 mass % with respect to 100 mass % of the composition.

According to a second aspect of the present invention, in the $LaNiO_3$ thin film-forming composition according to the first aspect, each of the $LaNiO_3$ precursors is a metal carboxylate, a metal nitrate, a metal alkoxide, a metal diol complex, a metal triol complex, a metal β-diketonate complex, a metal β-diketoester complex, a metal β-iminoketo complex, or a metal amino complex.

According to a third aspect of the present invention, in the $LaNiO_3$ thin film-forming composition according to the second aspect, at least either a $LaNiO_3$ precursor as a La source or a $LaNiO_3$ precursor as a Ni source among the $LaNiO_3$ precursors is an acetate, a nitrate, or an octylate.

According to a fourth aspect of the present invention, in the $LaNiO_3$ thin film-forming composition according to any one of the first to third aspects, the second organic solvent is at least one of N,N-dimethylformamide, N,N-dimethylacetamide, N-methylformamide, 4-butyrolactone, N-methylpyrrolidone, and propylene carbonate.

According to a fifth aspect of the present invention, there is provided a method of forming a $LaNiO_3$ thin film, in which the $LaNiO_3$ thin film-forming composition according to any one of the first to fourth aspects is used.

According to a sixth aspect of the present invention, there is provided a method of forming a $LaNiO_3$ thin film, including: forming a coating film on a heat-resistant substrate by coating the $LaNiO_3$ thin film-forming composition according to any one of the first to fourth aspects on the heat-resistant substrate; pre-baking the substrate including the coating film in an oxidation atmosphere or in a water vapor-containing atmosphere under atmospheric pressure to obtain a film, or repeating the formation of the coating film and the pre-baking of the substrate 2 times or more until a film having a predetermined thickness is obtained; and baking the film at a crystallization temperature or higher.

According to a seventh aspect of the present invention, there is provided a method of manufacturing a crystal orientation controlling layer of a dielectric layer having the $LaNiO_3$ thin film formed using the method according to the fifth or sixth aspect, wherein the dielectric layer is used for any one of an electrode of a complex electronic component of a thin film capacitor, a capacitor, an IPD, a DRAM memory capacitor, a laminated capacitor, a ferroelectric random access memory capacitor, a pyroelectric infrared detecting element, a piezoelectric element, an electro-optic element, an actuator, a resonator, an ultrasonic motor, an electric switch, an optical switch, and an LC noise filter element, or the complex electronic component.

The composition according to the first aspect contains: $LaNiO_3$ precursors; one or more first organic solvents selected from the group consisting of carboxylic acids, alcohols, esters, ketones, ethers, cycloalkanes, aromatic compounds, and tetrahydrofuran; one or more stabilizers selected from the group consisting of β-diketones, β-ketones, β-keto esters, oxyacids, diols, triols, carboxylic acids, alkanolamines, and polyvalent amines; and a second organic solvent having a boiling point of 150° C. to 300° C. and a surface tension of 20 dyn/cm to 50 dyn/cm. In this composition, a ratio of the $LaNiO_3$ precursors is 1 mass % to 20 mass % in terms of oxides with respect to 100 mass % of the composition, a ratio of the stabilizer is greater than 0 mol and less than or equal to 10 mol with respect to 1 mol of a total amount of the $LaNiO_3$ precursors in the composition, and a ratio of the second organic solvent is 5 mass % to 20 mass % with respect to 100 mass % of the composition. In this way, unlike the related art, the composition according to the present invention does not use a water-soluble component as a solvent and contains, particularly, the second organic solvent having a boiling point and a surface tension in the predetermined ranges at the predetermined ratio in addition to the first organic solvent. As a result, the formation of voids in a film can be significantly suppressed, and the film can be uniformly formed. In addition, since the composition according to the present invention contains the stabilizer at the predetermined ratio, storage stability can be improved.

The $LaNiO_3$ thin film-forming composition according to the second aspect contains, as each of the $LaNiO_3$ precursors, a metal carboxylate, a metal nitrate, a metal alkoxide, a metal diol complex, a metal triol complex, a metal β-diketonate complex, a metal β-diketoester complex, a metal β-iminoketo complex, or a metal amino complex. As a result, the uniformity of the composition can be improved.

In the $LaNiO_3$ thin film-forming composition according to the third aspect, at least either a $LaNiO_3$ precursor as a La source or a $LaNiO_3$ precursor as a Ni source among the $LaNiO_3$ precursors contains an acetate, a nitrate, or an octylate. By using an acetate, a nitrate, or an octylate as each of the $LaNiO_3$ precursors, even if a composition having a relatively high concentration is prepared, storage stability can be further improved.

The $LaNiO_3$ thin film-forming composition according to the fourth aspect contains, as the second organic solvent, at least one of N,N-dimethylformamide, N,N-dimethylacetamide, N-methylformamide, 4-butyrolactone, N-methylpyrrolidone, and propylene carbonate. By using these compounds as the second organic solvent having a boiling point and a surface tension in the predetermined ranges, an effect of reducing voids can be further enhanced. In addition, coating properties can be improved.

In the method of forming a $LaNiO_3$ thin film according to the fifth or sixth aspect, a $LaNiO_3$ thin film is formed using the above-described $LaNiO_3$ thin film-forming composition according to the present invention. Therefore, a $LaNiO_3$ thin film having extremely few voids and a uniform thickness can be formed.

With the method according to the seventh aspect, for example, when a ferroelectric random access memory, a piezoelectric element, or the like is manufactured, a uniform thin film having extremely few voids which is formed using the above-described film forming method can be used as a capacitor electrode of the ferroelectric random access memory or as an electrode of the piezoelectric element. As a result, a device having superior fatigue characteristics can be obtained. In addition, the film which is formed using the above-described film forming method has translucency, and thus can be used as an electrode film of a pyroelectric infrared detecting element. In addition, the $LaNiO_3$ thin film which is formed using the above-described film forming method is self-oriented to (100) plane. Therefore, particularly when a thin film capacitor, a piezoelectric element, or the like is manufactured, the film can also be used for manufacturing a crystal orientation controlling layer for controlling the crystal orientation of a dielectric layer.

DETAILED DESCRIPTION OF THE INVENTION

Figure 1:
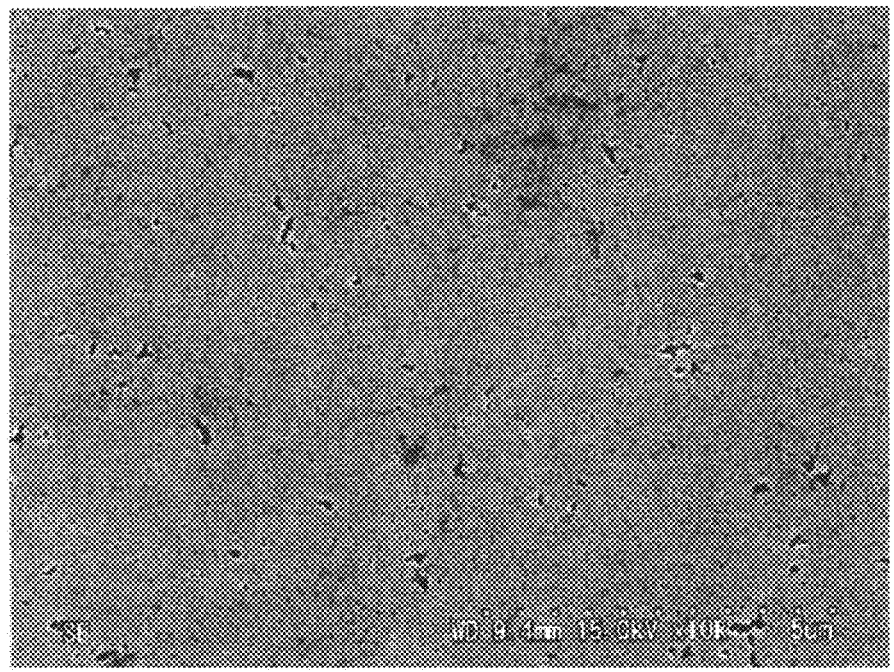
FIG. 1 is an image which is obtained by observing a surface of a $LaNiO_3$ thin film obtained in Example 1-4 using a scanning electron microscope (SEM).

Next, embodiments of the present invention will be described.

A composition according to the present invention is an improvement of a composition for forming a $LaNiO_3$ thin film. As a characteristics configuration, the composition contains $LaNiO_3$ precursors and a second organic solvent having a boiling point of 150° C. to 300° C. and a surface tension of 20 dyn/cm to 50 dyn/cm in addition to a first organic solvent and a stabilizer described below, in which a ratio of the $LaNiO_3$ precursors is 1 mass % to 20 mass % in terms of oxides with respect to 100 mass % of the composition, a ratio of the stabilizer is greater than 0 mol and less than or equal to 10 mol with respect to 1 mol of a total amount of the $LaNiO_3$ precursors in the composition, and a ratio of the second organic solvent is 5 mass % to 20 mass % with respect to 100 mass % of the composition.

The $LaNiO_3$ precursors contained in the composition are raw materials for constituting a complex metal oxide ($LaNiO_3$) in the formed $LaNiO_3$ thin film. Examples of the $LaNiO_3$ precursors include metal carboxylates, metal nitrates, metal alkoxides, metal diol complexes, metal triol complexes, metal β-diketonate complexes, metal β-diketoester complexes, metal β-iminoketo complexes, and metal amino complexes of metal elements La and Ni. Specifically, examples of a $LaNiO_3$ precursor as a La source include metal carboxylates such as lanthanum acetate, lanthanum octylate, or lanthanum 2-ethylhexanoate; metal nitrates such as lanthanum nitrate; metal alkoxides such as lanthanum isopropoxide; and metal β-diketonate complexes such as lanthanum acetylacetonate. In addition, examples of a $LaNiO_3$ precursor as a Ni source include metal carboxylates such as nickel acetate, nickel octylate, or nickel 2-ethylhexanoate; metal nitrates such as nickel nitrate; and metal β-diketonate complexes such as nickel acetylacetonate. From the viewpoints of obtaining high solubility in a solvent, storage stability, and the like, it is preferable that at least either the $LaNiO_3$ precursor as a La source or the $LaNiO_3$ precursor as a Ni source be an acetate, a nitrate, or an octylate. When the La source or the Ni source is a hydrate, the La source or the Ni source may be dehydrated in advance by heating or the like or may be dehydrated during the synthesis of the precursors by distillation or the like.

The reason for limiting the ratio of the LaNiO$_3$ precursors (both the La source and the Ni source) occupied in 100 mass % of the composition to be in the above-described range in terms of oxides is as follows. When the ratio of the LaNiO$_3$ precursors is lower than the lower limit, the thickness of the coating film is excessively small, and there is a problem in that cracks may be formed on the film. On the other hand, when the ratio of the LaNiO$_3$ precursors is higher than the upper limit, storage stability may deteriorate, for example, precipitates may be formed. It is preferable that the ratio of the LaNiO$_3$ precursors contained in the 100 mass % of the composition be 3 mass % to 15 mass % in terms of oxides. It should be noted that the ratio of the LaNiO$_3$ precursors in terms of oxides refers to the ratio of metal oxides occupied in 100 mass % of the composition on the assumption that all the metal elements contained in the composition are oxides. In addition, it is preferable that a mixing ratio of the LaNiO$_3$ precursor as a La source or the LaNiO$_3$ precursor as a Ni source be adjusted such that a ratio (La/Ni) of La atoms to Ni atoms is 1:1.

As the first organic solvent, carboxylic acids, alcohols (for example, ethanol, 1-butanol, or polyols other than diol), esters, ketones (such as acetone or methyl ethyl ketone), ethers (such as dimethylether or diethylether), cycloalkanes (such as cyclohexane or cyclohexanol), aromatic compounds (such as benzene, toluene, or xylene) or tetrahydrofuran; or mixed solvents of two or more of the above-described solvents can be used. The first organic solvent consists of the balance other than the other constituent components in the composition. By adding the first organic solvent, the concentration, ratios, and the like of the other constituent components occupied in the composition can be adjusted.

Preferable examples of carboxylic acids include n-butyric acid, α-methylbutyric acid, i-valeric acid, 2-ethylbutyric acid, 2,2-dimethylbutyric acid, 3,3-dimethylbutyric acid, 2,3-dimethylbutyric acid, 3-methylpentanoic acid, 4-methylpentanoic acid, 2-ethylpentanoic acid, 3-ethylpentanoic acid, 2,2-dimethylpentanoic acid, 3,3-dimethylpentanoic acid, 2,3-dimethylpentanoic acid, 2-ethylhexanoic acid, and 3-ethylhexanoic acid.

In addition, preferable examples of esters include ethyl acetate, propyl acetate, n-butyl acetate, sec-butyl acetate, tert-butyl acetate, isobutyl acetate, n-amyl acetate, sec-amyl acetate, tert-amyl acetate, and isoamyl acetate. Preferable examples of alcohols include 1-propanol, 2-propanol, 1-butanol, 2-butanol, isobutyl alcohol, 1-pentanol, 2-pentanol, 2-methyl-2-pentanol, and 2-methoxyethanol.

As the stabilizer, one or more elements selected from the group consisting of β-diketones (such as acetyl acetone, heptafluorobutanoyl pivaloyl methane, dipivaloyl methane, trifluoroacetyl acetone, or benzoyl acetone), β-ketonic acids (such as acetoacetic acid, propionyl acetic acid, or benzoyl acetic acid), β-keto esters (such as methyl, propyl, butyl, and other lower alkyl esters of the above-described ketonic acids), oxy acids (such as lactic acid, glycolic acid, α-oxybutyric acid, or salicylic acid), diols, triols, carboxylic acids, alkanol amines (such as diethanolamine, triethanolamine, or monoethanolamine), and polyvalent amines can be used. By adding these stabilizers, the storage stability of the composition can be improved. Among these, alkanol amines such as diethanolamine are particularly preferable because an effect of improving storage stability is high. The reason for limiting the ratio of the stabilizer to be greater than 0 mol and less than or equal to 10 mol with respect to 1 mol of a total amount of the LaNiO$_3$ precursors in the composition is as follows. When the ratio of the stabilizer is higher than the upper limit, the thermal decomposition of the stabilizer is delayed, and there is a problem in that voids remain in the film. It is preferable that the ratio of the stabilizer be 2 mol to 8 mol with respect to 1 mol of a total amount of the LaNiO$_3$ precursors. Examples of carboxylic acids which are preferable as the stabilizer include acetic acid, octyl acid, and 2-ethylhexanoic acid. When the same carboxylic acid as that of the first organic solvent is used as the stabilizer, the upper limit of the ratio of the stabilizer refers to the ratio of the carboxylic acid as the stabilizer. The balance in the composition exceeding the upper limit refers to the ratio of the carboxylic acid as the first organic solvent.

The second organic solvent is an organic solvent having a boiling point and a surface tension in the predetermined ranges. By adding this second organic solvent, particularly, an effect of significantly suppressing the formation of voids in the film after baking is obtained. The technical ground is presumed to be that gas components produced by the decomposition of the composition are likely to be desorbed through fine pores in the film formed by the second organic solvent during a high-temperature process such as baking. The reason for limiting the boiling point of the second organic solvent to be in a range of 150° C. to 300° C. is as follows. When an organic solvent having a boiling point lower than the lower limit is added as the second organic solvent, the above-described fine pores are not formed, and the gas components are not sufficiently desorbed and remain in the film, which may cause voids. On the other hand, when an organic solvent having a boiling point higher than the upper limit is added as the second organic solvent, the decomposition of the second organic solvent is delayed, and the second organic solvent remains in the film, which may cause voids. In addition, the reason for limiting the surface tension of the second organic solvent to be in a range of 20 dyn/cm to 50 dyn/cm is as follows. When an organic solvent having a surface tension less than the lower limit is added as the second organic solvent, the surface tension of the composition is excessively small, and the thickness of the coating film is excessively small. On the other hand, when an organic solvent having a surface tension greater than the upper limit is added as the second organic solvent, the surface tension of the composition is excessively large, which causes the formation of cracks. It is preferable that an organic solvent having a boiling point in a range of 150° C. to 250° C. and a surface tension in a range of 30 dyn/cm to 50 dyn/cm be used as the second organic solvent. Specific examples of the second organic solvent include at least one of N,N-dimethylformamide, N,N-dimethylacetamide, N-methylformamide, 4-butyrolactone, N-methylpyrrolidone, and propylene carbonate. The reason for limiting the ratio of the second organic solvent occupied in the 100 mass % of the composition to be 5 mass % to 20 mass % is as follows. When the ratio of the second organic solvent is lower than the lower limit, an effect of suppressing voids is not sufficiently obtained. On the other hand, when the ratio of the second organic solvent is higher than the upper limit, the surface tension of the composition is out of an appropriate value, the uniformity of the coating film deteriorates, and an effect of suppressing voids is not sufficiently obtained. It is preferable that the ratio of the second organic solvent be 5 mass % to 15 mass % with respect to 100 mass % of the composition.

In order to obtain the LaNiO$_3$ thin film-forming composition according to the present invention, first, the LaNiO$_3$ precursor as a La source and the LaNiO$_3$ precursor as a Ni source are prepared, respectively. These LaNiO$_3$ precursors are weighed such that the above-described desired metal atomic ratio is obtained. In addition, the stabilizer is prepared and weighed such that the above-described predetermined ratio is obtained with respect to 1 mol of the LaNiO$_3$ precursors (the total amount of the LaNiO$_3$ precursor as a La source and the LaNiO$_3$ precursor as a Ni source). Next, the LaNiO$_3$ precursor as a Ni source, the first organic solvent, and the stabilizer are poured into a reaction vessel and are mixed with each other. When the Ni source is a hydrate, distillation for dehydration may be performed. The LaNiO$_3$ precursor as a La source is added to the mixture and is heated, preferably, in an inert gas atmosphere at a temperature of 80° C. to 200° C. for 30 minutes to 2 hours to cause a reaction. As a result, a synthetic solution is prepared. When the La source is a hydrate, distillation for dehydration may be performed. Next, the first organic solvent is further added to dilute the precursor concentration to the above-described desired range. The second organic solvent is poured into the reaction vessel such that the above-described predetermined ratio is obtained, followed by stirring. As a result, a composition is obtained. After the preparation, in order to suppress temporal changes of the composition, it is preferable that the composition be heated, preferably, in an inert gas atmosphere at a temperature of 80° C. to 200° C. for 30 minutes to 2 hours.

In the present invention, it is preferable that particles be removed from the composition prepared as above by filtration or the like such that the number of particles having a particle size of 0.5 µm or greater (preferably 0.3 µm or greater and more preferably 0.2 µm or greater) be less than or equal to 50 particles/mL per 1 mL of the solution. In order to measure the number of particles in the composition, a light scattering particle counter is used.

When the number of particles having a particle size of 0.5 µm or greater in the composition is more than 50 particles/mL, long-term storage stability deteriorates. The less number of particles having a particle size of 0.5 µm or greater in the composition, the better. In particular, the number of particles is preferably less than or equal to 30 particles/mL.

A method of treating the prepared composition to obtain the above-described number of particles is not particularly limited. For example, the following method may be used. A first method is a filtration method of supplying pressure with a syringe using a commercially available membrane filter having a pore size of 0.2 µm. A second method is a pressure filtration method in which a commercially available membrane filter having a pore size of 0.05 µm is combined with a pressure tank. A third method is a circulation filtration method in which the filter used in the second method is combined with a solution circulating tank.

In all the methods, a particle capture rate by the filter varies depending on a solution supply pressure. It is generally known that, the lower the pressure, the higher the capture rate. Particularly in the first method and the second method, in order to realize the condition that the number of particles having a particle size of 0.5 µm or greater is less than or equal to 50 particles/mL, it is preferable that the solution be made to pass extremely slowly through the filter at a low pressure.

Next, a method of forming a LaNiO$_3$ thin film according to the present invention will be described. First, a coating film having a desired thickness is formed by coating the LaNiO$_3$ thin film-forming composition on a substrate. The coating method is not particularly limited, and examples thereof include spin coating, dip coating, liquid source misted chemical deposition (LSMCD), and electrostatic spray coating. A substrate on which the LaNiO$_3$ thin film is formed varies depending on the use of the film and the like. For example, when the LaNiO$_3$ thin film is used as a crystal orientation controlling layer of a thin film capacitor or the like, a heat-resistant substrate, such as a silicon substrate or a sapphire substrate, on which a lower electrode is formed is used. As the lower substrate which is formed on the substrate, a material, such as Pt, Ir, or Ru, which has conductivity and is not reactive with the LaNiO$_3$ thin film is used. In addition, for example, a substrate below which a lower electrode is formed with an adhesion layer, an insulating film, and the like interposed therebetween can be used. Specific examples of the substrate include substrates having a laminate structure (lower electrode/adhesion layer/insulating film/substrate) of Pt/Ti/SiO$_2$/Si, Pt/TiO$_2$/SiO$_2$/Si, Pt/IrO/Ir/SiO$_2$/Si, Pt/TiN/SiO$_2$/Si, Pt/Ta/SiO$_2$/Si, or Pt/Ir/SiO$_2$/Si. On the other hand, when the LaNiO$_3$ thin film is used as an electrode of a ferroelectric random access memory capacitor, a piezoelectric element, a pyroelectric infrared detecting element, or the like, a heat-resistant substrate such as a silicon substrate, a SiO$_2$/Si substrate, or a sapphire substrate can be used.

After the coating film is formed on the substrate, this coating film is pre-baked and then baked to be crystallized. Pre-baking is performed using a hot plate and RTA or the like under a predetermined condition. It is preferable that pre-baking be performed in the air, in an oxygen atmosphere or in a water vapor-containing atmosphere in order to remove a solvent and to thermally decompose or hydrolyze a metal compound to be transformed into a complex oxide. Even during heating in the air, moisture required for hydrolysis is sufficiently secured with moisture in the air. Before pre-baking, particularly in order to remove low-boiling-point components or adsorbed water molecules, a low-temperature heat treatment may be performed using a hot plate at a temperature of 60° C. to 120° C. for 1 minute to 5 minutes. It is preferable that pre-baking be performed at a temperature of 150° C. to 550° C. for 1 minute to 10 minutes. When a desired film thickness is obtained by performing the coating process once, the coating process of the composition to the pre-baking process are performed once, and then baking is performed. Alternatively, the coating process of the composition to the pre-baking process are repeated multiple times until a film having a predetermined thickness is obtained. Then, finally, baking is performed in a batch process.

Baking is the process for baking the pre-baked coating film at a crystallization temperature or higher to be crystallized. As a result, a LaNiO$_3$ thin film is obtained. As a baking atmosphere in this crystallization process, O$_2$, N$_2$, Ar, N$_2$O, H$_2$, or a mixed gas thereof is preferable. Baking is performed by holding the coating film preferably at 450° C. to 900° C. for 1 minute to 60 minutes. Baking may be performed by rapid thermal annealing (RTA). A temperature increase rate from room temperature to the baking temperature is preferably 10° C./sec to 100° C./sec.

Through the above-described processes, the LaNiO$_3$ thin film is obtained. The LaNiO$_3$ thin film formed as above has a low surface resistivity, superior conductivity and the like, and translucency. Therefore, the LaNiO$_3$ thin film can be used as, for example, an electrode film of a ferroelectric random access memory capacitor, an electrode film of a piezoelectric element, or an electrode film of a pyroelectric infrared detecting element. Further, since the LaNiO$_3$ thin film is self-oriented to (100) plane, the LaNiO$_3$ thin film can be desirably used as a crystal orientation controlling layer for preferentially orienting the crystal orientation of a dielectric layer to (100) plane in a thin film capacitor or the like. In addition, in the case of a piezoelectric element, piezoelectric characteristics can be improved.

EXAMPLES

Next, examples of the present invention and comparative examples will be described in detail.

Example 1-1

First, as the $LaNiO_3$ precursors, a nickel acetate tetrahydrate (Ni source) and a lanthanum octylate (La source) were prepared, and these $LaNiO_3$ precursors were weighed such that a ratio of La atoms to Ni atoms was 1:1. In addition, as the stabilizer, diethanolamine was prepared in an amount of 5 mol with respect to 1 mol of the total amount of the precursors.

The nickel acetate tetrahydrate, 1-butanol as the first organic solvent, and diethanolamine as the stabilizer were poured into a reaction vessel and were mixed with each other, followed by distillation. Further, the lanthanum octylate and isoamyl acetate as the first organic solvent were added to the mixture and was heated in an inert gas atmosphere at a temperature of 140° C. for 1 hour. As a result, a synthetic solution (ester mixed solution) was prepared. Next, 1-butanol was further added to dilute the solution to the predetermined concentration. N,N-dimethylformamide as the second organic solvent was poured to the reaction vessel such that the ratio thereof was 10 mass % with respect to 100 mass % of the prepared composition, followed by stirring. As a result, a composition having a concentration of the precursors of 5 mass % in terms of oxides was prepared. After the preparation, the composition was filtered using a pressure filtration method in which a membrane filter and a pressure tank were combined.

Next, the obtained composition was dripped on a $SiO_2/Si$ substrate which was set on a spin coater and had a crystal plane oriented to (100) direction, followed by spin-coating at a rotating speed of 2000 rpm for 20 seconds. As a result, a coating film was formed on the substrate. Next, before pre-baking and baking, the substrate on which the coating film was formed was held in the air at a temperature of 75° C. for 1 minute using a hot plate. As a result, low-boiling-point components and adsorbed water molecules were removed. Next, the coating film formed on the substrate was pre-baked by being held at a temperature of 400° C. for 5 minutes using a hot plate. Next, using RTA, the pre-baked coating film was baked by being heated in an oxygen atmosphere to 800° C. at a temperature increase rate of 10° C./sec and being held at this temperature for 5 minutes. As a result, a $LaNiO_3$ thin film was formed on the substrate. It should be noted that the film having a desired total thickness was formed by performing the process of forming the coating film to the pre-baking process once without repetition and then performing the baking process once.

Examples 1-2 to 1-6

Comparative Example 1

Compositions were prepared with the same method as that of Example 1-1, except that solvents having different boiling points and surface tensions were used as shown in Table 1 below instead of N,N-dimethylformamide as the second organic solvent. Using these compositions, $LaNiO_3$ thin films were formed.

Example 1-7

A composition was prepared with the same method as that of Example 1-4, except that a film having a desired total thickness was formed by repeating the process of forming the coating film to the pre-baking process 5 times and then performing the baking process once. Using this composition, a $LaNiO_3$ thin film was formed.

Examples 2-1 to 2-3

Comparative Examples 2-1 and 2-2

Compositions were prepared with the same method as that of Example 1-4, except that the concentrations of the precursors in the compositions in terms of oxides were changed by adjusting each component ratio as shown in Table 1 below. Using these compositions, $LaNiO_3$ thin films were formed.

Examples 3-1 and 3-2

Comparative Examples 3-1 and 3-2

Compositions were prepared with the same method as that of Example 1-4, except that the ratios of the stabilizers with respect to 1 mol of the precursors were changed as shown in Table 1 below. Using these compositions, $LaNiO_3$ thin films were formed. In Comparative Example 3-1, the ratio of the stabilizer with respect to 1 mol of a total amount of the precursors was 0 mol, that is, the composition was prepared without adding the stabilizer.

Examples 4-1 to 4-3

Comparative Examples 4-1 to 4-3

Compositions were prepared with the same method as that of Example 1-4, except that the ratios of 4-butyrolactone as the second organic solvent occupied in 100 mass % of the composition were changed as shown in Table 1 below. Using these compositions, $LaNiO_3$ thin films were formed. In Comparative Example 4-1, the ratio of the second organic solvent occupied in 100 mass % of the composition was 0 mass %, that is, the composition was prepared without adding the second organic solvent.

<Comparative Test and Evaluation>

The thickness and the number of voids of each of the $LaNiO_3$ thin films obtained in Examples 1-1 to 4-3 and Comparative Examples 1-1 to 4-3 were evaluated. The results are shown in Table 1 below.

(1) Thickness: The thickness of a cross-section of the formed $LaNiO_3$ thin film was measured by imaging a cross-sectional image thereof using a scanning electron microscope (SEM, Hitachi S-4300SE).

Figure 2:
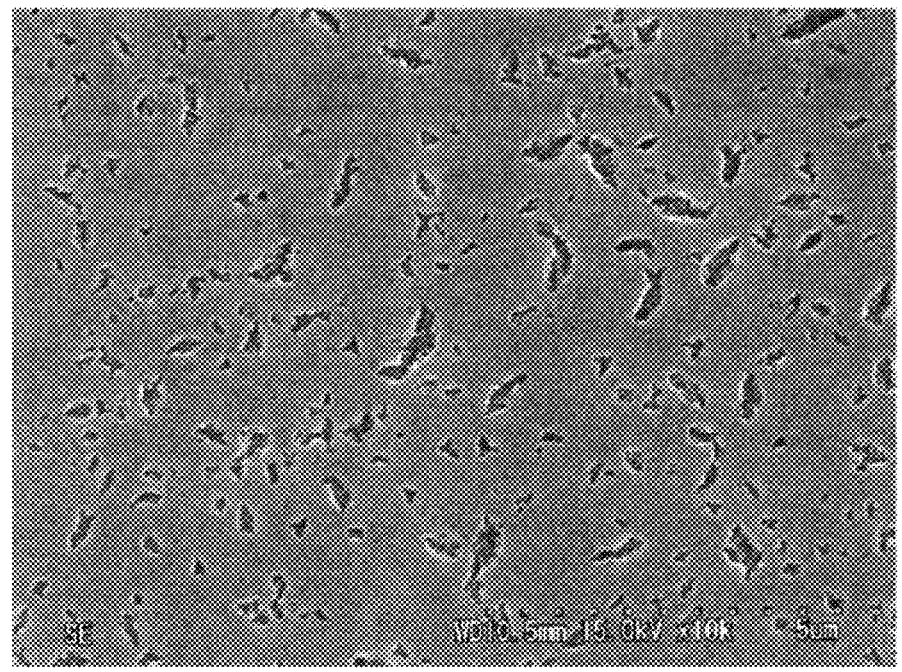
FIG. 2 is an image which is obtained by observing a surface of a $LaNiO_3$ thin film obtained in Comparative Example 1 using an SEM.

(2) Number of voids: Using the SEM, the surface of the $LaNiO_3$ thin film was imaged to count the number of voids having a diameter of 0.3 µm or greater present per unit area (25 µm$^2$). As the void diameter, when the shape of a void was circular, the diameter thereof was used; and when the shape of a void was non-circular, the average of a long diameter and a short diameter (maximum diameter perpendicular to the long diameter) was used. The images of the film surfaces of Example 1-4 and Comparative Example 1 imaged at this time are illustrated in FIGS. 1 and 2 as representative images, respectively.

TABLE 1

| | Composition | | | | | | Repeating Times of Coating | Evaluation of Film | |
|---|---|---|---|---|---|---|---|---|---|
| | Precursors | Stabilizer | Second Organic Solvent | | | | | | |
| | Concentration (mass %) | Ratio (mol) | Ratio (mass %) | Kind | Boiling Point (° C.) | Surface Tension dyn/cm | Process (Times) | Thickness (nm) | Number of Voids |
| Example 1-1 | 5 | 5 | 10 | N,N-Dimethylformamide | 153.0 | 35.2 | 1 | 52 | 8 |
| Example 1-2 | 5 | 5 | 10 | N-Methylformamide | 180.0 | 38.0 | 1 | 55 | 9 |
| Example 1-3 | 5 | 5 | 10 | N,N-Dimethylacetamide | 166.1 | 32.4 | 1 | 53 | 7 |
| Example 1-4 | 5 | 5 | 10 | 4-Butyrolactone | 204.0 | 44.0 | 1 | 58 | 7 |
| Example 1-5 | 5 | 5 | 10 | N-Methylpyrrolidone | 202.0 | 41.0 | 1 | 53 | 6 |
| Example 1-6 | 5 | 5 | 10 | Propylene Carbonate | 242.0 | 40.9 | 1 | 56 | 8 |
| Example 1-7 | 5 | 5 | 10 | 4-Butyrolactone | 204.0 | 44.0 | 5 | 285 | 8 |
| Comparative Example 1 | 5 | 5 | 10 | Formamide | 210.5 | 57.9 | 1 | 55 | 30 |
| Comparative Example 2-1 | 0.5 | 5 | 10 | 4-Butyrolactone | 204.0 | 44.0 | 1 | — | — |
| Example 2-1 | 1 | 5 | 10 | 4-Butyrolactone | 204.0 | 44.0 | 1 | 40 | 9 |
| Example 2-2 | 10 | 5 | 10 | 4-Butyrolactone | 204.0 | 44.0 | 1 | 60 | 8 |
| Example 2-3 | 20 | 5 | 10 | 4-Butyrolactone | 204.0 | 44.0 | 1 | 65 | 9 |
| Comparative Example 2-2 | 22 | 5 | 10 | 4-Butyrolactone | 204.0 | 44.0 | — | — | — |
| Comparative Example 3-1 | 5 | 0 | 10 | 4-Butyrolactone | 204.0 | 44.0 | 1 | 50 | 15 |
| Example 3-1 | 5 | 1 | 10 | 4-Butyrolactone | 204.0 | 44.0 | 1 | 53 | 9 |
| Example 3-2 | 5 | 10 | 10 | 4-Butyrolactone | 204.0 | 44.0 | 1 | 52 | 7 |
| Comparative Example 3-2 | 5 | 12 | 10 | 4-Butyrolactone | 204.0 | 44.0 | 1 | 55 | 15 |
| Comparative Example 4-1 | 5 | 5 | 0 | — | — | — | 1 | 56 | 20 |
| Comparative Example 4-2 | 5 | 5 | 4 | 4-Butyrolactone | 204.0 | 44.0 | 1 | 57 | 11 |
| Example 4-1 | 5 | 5 | 5 | 4-Butyrolactone | 204.0 | 44.0 | 1 | 52 | 9 |
| Example 4-2 | 5 | 5 | 15 | 4-Butyrolactone | 204.0 | 44.0 | 1 | 48 | 8 |
| Example 4-3 | 5 | 5 | 20 | 4-Butyrolactone | 204.0 | 44.0 | 1 | 45 | 9 |
| Comparative Example 4-3 | 5 | 5 | 22 | 4-Butyrolactone | 204.0 | 44.0 | 1 | 40 | 13 |

As clearly seen from Table 1, when Examples 1-1 to 1-7 are compared to Comparative Example 1, the results are as follows. In Comparative Example 1 in which formamide was added as the second organic solvent, an extremely large number of voids were formed on the surface of the formed film. The reason is presumed to be that, by adding formamide having a surface tension greater than the predetermined value, the surface tension of the composition was excessively large, and the coating film was not able to be uniformly formed. On the other hand, in Examples 1-1 to 1-7 in which the solution, such as N,N-dimethylformamide, having the predetermined boiling point and surface tension was added as the second organic solvent, the formation of voids was significantly suppressed, and the film was able to be uniformly formed.

In addition, when Examples 2-1 to 2-3 are compared to Comparative Examples 2-1 and 2-2, the results are as follows. In Comparative Example 2-1 in which the concentration of the precursors was less than 1 mass % in terms of oxides with respect to 100 mass % of the composition, cracks were formed on the formed LaNiO$_3$ thin film to the extent that the cracks can be confirmed by visual inspection, and the film was not able to be uniformly formed. As a result, the evaluation of the film was not able to be performed. In addition, in Comparative Example 2-2 in which the concentration of the precursors was greater than 20 mass %, precipitates were formed in the composition. Therefore, the LaNiO$_3$ thin film was not able to be formed. On the other hand, in Examples 2-1 to 2-3 in which the concentration of the precursors was in a range of 1 mass % to 20 mass %, the formation of voids was significantly suppressed, and the film was able to be uniformly formed.

In addition, when Examples 3-1 and 3-2 are compared to Comparative Examples 3-1 and 3-2, the results are as follows. In Comparative Example 3-1 in which the stabilizer was not added and in Comparative Example 3-2 in which the ratio of the stabilizer was greater than 10 mol with respect to 1 mol of the total amount of the LaNiO$_3$ precursors in the composition, the number of voids formed were greater than those of the Examples 3-1 and 3-2. The reasons are presumed to be that, in Comparative Example 3-1, since the stabilizer was not added, particles were formed in the composition; and in Comparative Example 3-2, the thermal decomposition of the stabilizer was delayed. On the other hand, in Examples 3-1 and 3-2 in which 10 mol or less of the stabilizer was added with respect to 1 mol of the total amount of the LaNiO$_3$ precursors, the formation of voids was significantly suppressed, and the film was able to be uniformly formed.

In addition, when Examples 4-1 to 4-3 are compared to Comparative Examples 4-1 to 4-3, the results are as follows. In Comparative Example 4-1 in which the second organic solvent was not added, the addition effect of the solvent was not obtained, and an extremely large number of voids were formed on the surface of the formed film. In addition, in Comparative Example 4-2 in which the ratio of the second organic solvent was lower than 5 mass % with respect to 100 mass % of the composition and in Comparative Example 4-3 in which the ratio was higher than 20 mass %, the effect of suppressing voids was obtained to a certain extent but was lower than that of Examples 4-1 to 4-3. The reasons are presumed to be that, in Comparative Example 4-2, since the second organic solvent was insufficient, the addition effect was not sufficiently obtained; and in Comparative Example 4-3, since the second organic solvent was excessively added, the surface tension of the composition was out of an appropriate value, and the uniformity of the coating film deteriorated. On the other hand, in Examples 4-1 to 4-3 in which the ratio of the second organic solvent was 5 mass % to 20 mass %, the formation of voids was significantly suppressed, and the film was able to be uniformly formed.

The present invention can be used for manufacturing an electrode of a complex electronic component such a thin film capacitor, a capacitor, an IPD, a DRAM memory capacitor, a laminated capacitor, a ferroelectric random access memory capacitor, a pyroelectric infrared detecting element, a piezoelectric element, an electro-optic element, an actuator, a resonator, an ultrasonic motor, an electric switch, an optical switch, or an LC noise filter element; or can be used for manufacturing a crystal orientation controlling layer of a dielectric layer used for the complex electronic component.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A $LaNiO_3$ thin film-forming composition for forming a $LaNiO_3$ thin film, the composition comprising:
   $LaNiO_3$ precursors;
   one or more first organic solvents selected from the group consisting of carboxylic acids, alcohols, esters, ketones, ethers, cycloalkanes, aromatic compounds, and tetrahydrofuran;
   one or more stabilizers selected from the group consisting of β-diketones, β-ketones, β-keto esters, oxyacids, diols, triols, carboxylic acids, alkanolamines, and polyvalent amines; and
   a second organic solvent having a boiling point of 150° C. to 300° C. and a surface tension of 20 dyn/cm to 50 dyn/cm,
   wherein a ratio of the $LaNiO_3$ precursors is 1 mass % to 20 mass % in terms of oxides with respect to 100 mass % of the composition,
   a ratio of the stabilizer is greater than 0 mol and less than or equal to 10 mol with respect to 1 mol of a total amount of the $LaNiO_3$ precursors in the composition, and
   a ratio of the second organic solvent is 5 mass % to 20 mass % with respect to 100 mass % of the composition.

2. The $LaNiO_3$ thin film-forming composition according to claim 1,
   wherein each of the $LaNiO_3$ precursors is a metal carboxylate, a metal nitrate, a metal alkoxide, a metal diol complex, a metal triol complex, a metal β-diketonate complex, a metal β-diketoester complex, a metal β-iminoketo complex, or a metal amino complex.

3. The $LaNiO_3$ thin film-forming composition according to claim 2,
   wherein at least either a $LaNiO_3$ precursor as a La source or a $LaNiO_3$ precursor as a Ni source among the $LaNiO_3$ precursors is an acetate, a nitrate, or an octylate.

4. The $LaNiO_3$ thin film-forming composition according to claim 1,
   wherein the second organic solvent is at least one of N,N-dimethylformamide, N,N-dimethylacetamide, N-methylformamide, 4-butyrolactone, N-methylpyrrolidone, and propylene carbonate.

5. A method of forming a $LaNiO_3$ thin film,
   wherein the $LaNiO_3$ thin film-forming composition according to claim 1 is used.

6. A method of forming a $LaNiO_3$ thin film, comprising:
   forming a coating film on a heat-resistant substrate by coating the $LaNiO_3$ thin film-forming composition according to claim 1 on the heat-resistant substrate;
   pre-baking the substrate including the coating film in an oxidation atmosphere or in a water vapor-containing atmosphere under atmospheric pressure to obtain a film, or
   repeating the formation of the coating film and the pre-baking of the substrate 2 times or more until a film having a predetermined thickness is obtained; and
   baking the film at a crystallization temperature or higher.

* * * * *